(12) United States Patent
Gryder et al.

(10) Patent No.: US 6,779,787 B2
(45) Date of Patent: Aug. 24, 2004

(54) APPARATUS AND METHOD FOR ROTATING HEAVY OBJECTS

(75) Inventors: Wayne Gryder, Maggie Valley, NC (US); Steve Haney, Waynesville, NC (US)

(73) Assignee: Kendro Laboratory Products, Inc., Asheville, NC (US)

( * ) Notice: Subject to any disclaimer, the term of this patent is extended or adjusted under 35 U.S.C. 154(b) by 204 days.

(21) Appl. No.: 10/020,966

(22) Filed: Dec. 19, 2001

(65) Prior Publication Data

US 2003/0111784 A1 Jun. 19, 2003

(51) Int. Cl.$^7$ ................................................. B25B 1/22
(52) U.S. Cl. ....................... 269/71; 269/289 R; 269/905
(58) Field of Search ........................... 269/71, 37, 905, 269/289 R; 248/394, 631, 164; 108/147, 138

(56) References Cited

U.S. PATENT DOCUMENTS

| | | | |
|---|---|---|---|
| 2,264,419 A | | 12/1941 | Unger et al. |
| 3,777,920 A | | 12/1973 | Wiese |
| 5,037,047 A | | 8/1991 | Chanko |
| 5,372,536 A | * | 12/1994 | Bialek .......................... 451/213 |
| 5,400,720 A | * | 3/1995 | Stevens ....................... 108/147 |
| 5,431,112 A | | 7/1995 | Thompson |
| 5,588,377 A | * | 12/1996 | Fahmian ...................... 108/145 |
| 5,725,205 A | * | 3/1998 | O'Berg ......................... 269/37 |

* cited by examiner

*Primary Examiner*—Lee D. Wilson
(74) *Attorney, Agent, or Firm*—Baker & Hostetler LLP

(57) ABSTRACT

A table having a two-part table top, wherein each part is independently pivotable, and a base which can double as a lift mechanism for raising and lowering the table top. The table top is useful for rotating heavy objects during manufacture to access the underside of the objects for installation of components. The table top can also be raised and lowered allowing installation of components without resort to a stepladder.

17 Claims, 6 Drawing Sheets

APPARATUS AND METHOD FOR ROTATING HEAVY OBJECTS

FIELD OF THE INVENTION

The present invention relates generally to manufacturing heavy equipment. More particularly, the present invention relates to an apparatus for rotating heavy equipment to provide access for installation of components. The invention is useful, for example, for rotating industrial ovens to provide access to their underside for installation of components.

BACKGROUND OF THE INVENTION

In the production of industrial equipment, it is often necessary to access the undersides of such equipment for installation of components. Typically, for heavy equipment, this requires several people to manually turn the equipment to expose the underside for installation of components. In addition, installation of components, which can be heavy and/or unwieldy, must often be performed at unsafe heights.

For example, in the production of certain industrial ovens, many components are mounted underneath the ovens. The units, which can weigh over 350 pounds, require at least two people to turn them to expose the underside. Further, these ovens are often assembled on workbenches three feet off the floor. Thus, components may be installed approximately five feet off the floor, requiring the use of stepladders. This approach is particularly unsafe for the installation of oven doors, which can each weigh over 50 pounds.

Thus, there is a need for an apparatus and method for turning heavy equipment, which allows access to the underside of the equipment. There is also a need for an apparatus and method which can enable installation of components without the use of a stepladder. More particularly, there is a need for an apparatus and method, which can alleviate back stress and dangers posed by manually turning equipment, and installing components at unsafe heights. It is also desirable to provide a method and apparatus for mechanically rather than manually rotating heavy objects.

SUMMARY OF THE INVENTION

The foregoing needs are met, to a great extent, by the present invention, wherein in one aspect an apparatus is provided having a two-part table top, wherein each part is independently pivotable.

In another aspect of the invention, the apparatus further includes a lift mechanism for raising and lowering the table top.

In yet another aspect of the present invention, a method of rotating objects is provided wherein the parts of the table top are pivoted with a drive system thereby rotating the object.

The above and other features and advantages are achieved through the use of a novel heavy-object rotating apparatus as herein disclosed. In accordance with one embodiment of the present invention, a work bench is provided for rotating heavy objects. The work bench includes a table top having a first portion and a second portion; a base; a drive system; and an engagement mechanism for reversibly locking the first portion and the second portion together; wherein, the first portion and second portion are independently, pivotally disposed on the base such that each can move between a first, lowered position and a second, raised position; and wherein the first portion is further operatively connected to the drive system.

In accordance with another embodiment of the present invention, the work bench further includes a first and a second up limit switch; wherein, when tripped by rotation of the first portion, the first up limit switch prevents the drive system from further rotating the first portion, either alone or when locked together with the second portion, and, when tripped by rotation of the second portion, the second up limit switch prevents the drive system from further rotation of the second portion when locked together with the first portion.

In accordance with yet another embodiment of the present invention a method for rotating heavy objects using the inventive apparatus is provided. The process includes:

engaging the drive system until the first portion reaches its second, raised position;

engaging the engagement mechanism thereby locking together the first portion and the second portion;

placing an object to be turned on the second portion; and engaging the drive system until the first portion moves back to its first, lowered position.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides an apparatus suitable for receiving objects from a conveyer belt, turning the objects on their side to access the underside of the object, and returning the objects to their original position. Generally, for rotating three-dimensional rectangular objects (hereinafter "rectangular"), this is accomplished by providing a table having a two-part table top, wherein each part is independently pivotable. The first and second part of the table top are positioned to form an approximately ninety degree angle by rotating the first part until it is approximately perpendicular to the ground. The object to be turned is placed on the second part, and then the both the first and second part of the table top are rotated ninety degrees so that the first part is now approximately parallel to the ground and the second part is approximately perpendicular to the ground. The second part can then be independently rotated so that it is again approximately level with the ground, providing access to the underside of the object.

The present invention can also be adapted to raise and lower the object so that the object can be accessed without resorting to the use of a stepladder. Generally, this can be accomplished by providing a base, such as a scissors lift, which doubles as a lift mechanism, or by providing a separate lift mechanism. An example of an object for which this apparatus can be adapted for use—industrial ovens weighing at least about 350 pounds and having dimensions of at least about 29" (W)×37" (D)×39" (H)—is referred to repeatedly in the detailed description, but should not be considered limiting. A person of ordinary skill should recognize that the apparatus can be used, or adapted for use, for turning objects other than the exemplified industrial ovens, including objects which vary in size, shape and/or weight from such ovens. Consequently, the dimensions and specifications provided below of various components of the apparatus, including the dimensions of the table top portions, the range of motion for the table top portions, and the specifications of the drive mechanism, are exemplary only, having been chosen as suitable for the above-described industrial ovens.

Thus, for example, an apparatus according to the present invention but designed for use with objects smaller in size than the above-described industrial ovens may function suitably with tables of smaller dimension. Similarly, for apparatus in accordance with the present invention but designed for use with objects heavier than the above-described industrial ovens, it may, for example, be preferable to use a lift mechanism with a higher weight specification, or to use more durable materials for the table top portions. Or else, for apparatus according to the present invention designed for use with non-rectangular objects, it may be preferable for the table top portions to pivot more or less than ninety degrees.

Figure 1:
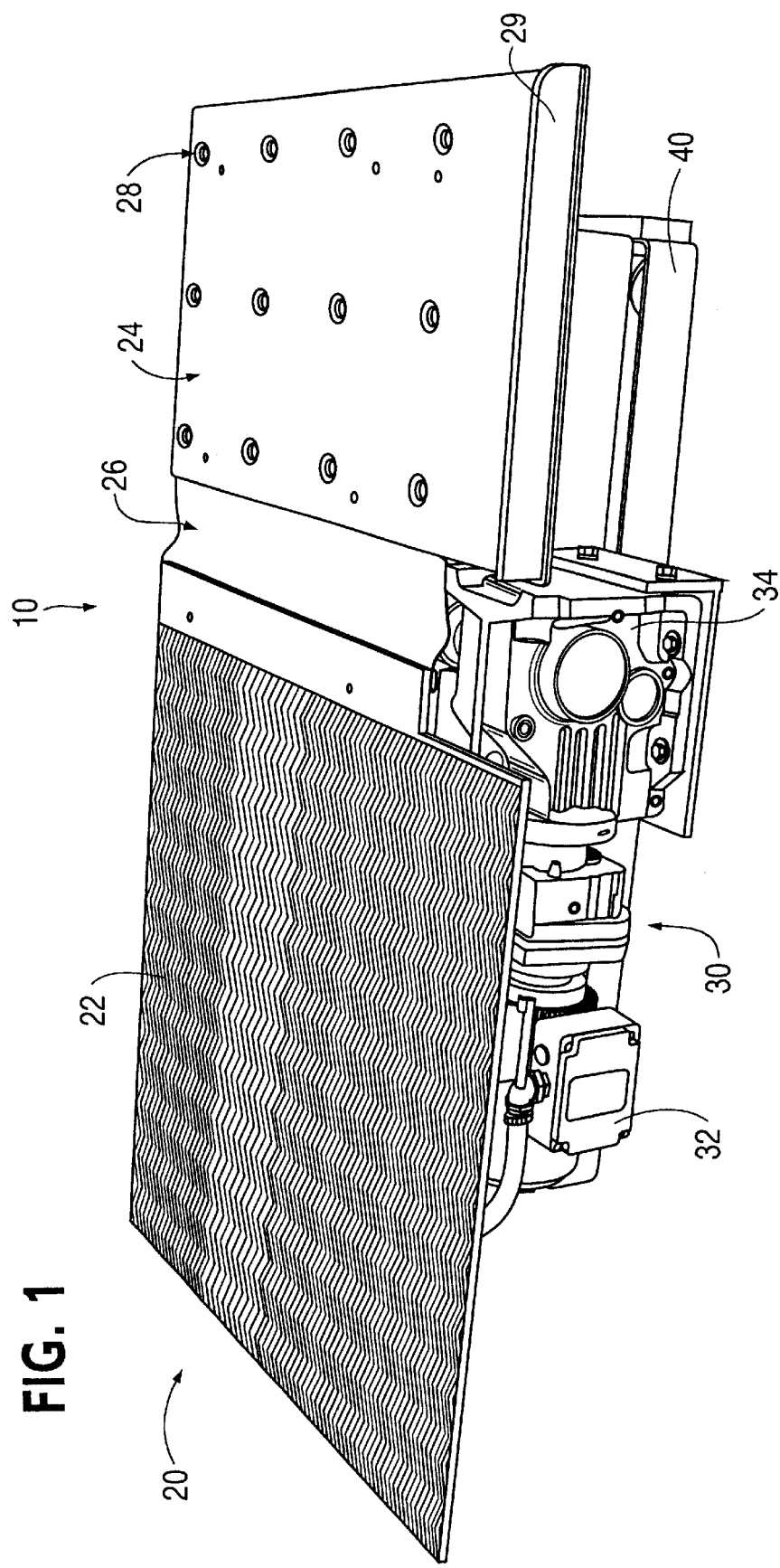
FIG. 1 is a perspective view of a heavy-object rotating apparatus, with first and second table portions in the first, lowered position, in accordance with a preferred embodiment of the present invention.

Referring now to the figures, wherein like reference numerals indicate like elements, FIG. 1 illustrates a heavy object rotation apparatus 10 in accordance with a preferred embodiment of the invention. The heavy object rotation apparatus 10 includes a table top 20, which is operatively connected to a drive system 30 and which is disposed upon a base 40.

The table top 20 includes a first portion 22 and a second portion 24. As in the case of the illustrated embodiment, the first portion 22 can be optionally spaced apart from the second portion 24. In such circumstances, an optional membrane 26 can be mounted between the first portion 22 and the second portion 24 to prevent dust or other debris from falling onto the base 40.

The first portion 22 can be carpeted (as shown) or otherwise covered to provide padding for the heavy object and/or a frictional surface to inhibit the object from slipping. The length and width of the first portion 22 are governed by the dimensions of the tallest and deepest object to be turned. Preferably, the length and width of the first portion 22 are about the same as the height and depth of the tallest and deepest object to be turned. For example, for industrial ovens having a height of 39" and depth of 37", the length of the first portion 22 would preferably be about 39" and the depth of the first portion 22 would preferably be about 37". However, as a person of ordinary skill should recognize, it is not necessary for the first portion 22 dimensions to correspond to the object dimensions exactly. Specifically, the first portion 22 can accommodate objects of smaller dimension, and thus in the case of the illustrated embodiment, could accommodate any objects shorter than 39" and/or thinner than 37". As well, the first portion 22 could accommodate objects that are taller than 39" and deeper than 37"; the first portion 22 need be only of sufficient size such that the object will not fall off the first portion 22. Thus, in the case of the illustrated embodiment, the first portion 22 could accommodate objects taller than 39" and/or deeper than 37".

The second portion 24 may have optional ball transfers 28 mounted therein, or any other suitable component to ease object movement. The second portion 24 may also have an optional lip portion 29 to facilitate safe movement of the heavy object from the conveyer belt to the table. Specifically, the lip portion 29 can prevent the heavy object from rolling off the edge of the table due to momentum. Although only a single lip portion is shown, the second portion 24 may have an additional, optional lip portion. Similarly, the first portion 22 may be manufactured with lip portions if desired.

The length and width of the second portion 24 are governed by the dimensions of the widest and deepest object to be turned. Preferably, the length and width of the second portion 24 are about the same as the width and depth of the widest and deepest object to be turned. For example, for industrial ovens having a width of 29" and depth of 37", the length of the second portion 24 would preferably be about 29" and the depth of the second portion 24 would preferably be about 37". However, as with the dimensions of the first portion 24, a person of ordinary skill will recognize that it is not necessary for the second portion 24 dimensions to correspond exactly to the object dimensions. Specifically, the second portion 24 can accommodate objects of smaller dimension, and thus in the case of the illustrated embodiment, could accommodate any objects narrower than 29" and/or thinner than 37". As well, the second portion 24 could accommodate objects that are wider than 29" and deeper than 37"; the second portion 24 need be only of sufficient size such that the object will not fall off the table. Thus, in the case of the illustrated embodiment, the second portion 24 could accommodate objects wider than 29" and/or deeper than 37".

The first portion 22 and second portion 24 are provided by any material, such as aluminum, steel or plywood, suitable for carrying the intended load. The "intended load" is understood to be not only the object to be rotated, but when applicable, may also include any additional equipment which may be placed on the table top, or any people who may sit or stand on the table top, while installing components. In the case of the 350 pound industrial oven described above, wherein it is anticipated that workers may be placing tools and components for installation on the table, and may be sitting on the table themselves, ¼" plate aluminum is preferred for both the first portion 22 and second portion 24 due to its combination of durability, rigidity, and light weight.

The drive system 30 can be any system, for example pneumatic, hydrolic, motorized, or manual, suitable for effecting back and forth rotation of the second portion 24, alone or while engaged with the first portion 22, between a lowered and raised position. Preferably, the drive system 30 will effect this back and forth rotation at a rate of about three feet per minute, which is a suitably swift rate but which rate will not cause the object to be turned to slide off the end of the table. Swifter rates can also be used, but for safety reasons, the table should be optionally equipped with a strap or other means to prevent the object to be turned from sliding off the end of the table.

In the illustrated embodiment, the drive system 30 is a motorized system including a motor 32 coupled to a variable speed gear box 34 and frequency inverter (not shown). The exact drive system components and specifications are determined by the weight of the object to be turned, the rate at which it is desired to turn that object, component availability and economics. Thus, for example, assuming a 350 pound industrial oven to be a mid-range application, the drive system may include a one horsepower, 1750-rpm motor 32, a 400:1 ratio variable speed gearbox 34, and a frequency inverter. Alternatively, additional gear boxes can be used in lieu of the frequency inverter. However, a frequency inverter is preferred because it is less cumbersome and less costly. The resultant drive system 30 can be adjusted to rotate the table top at rates ranging from about one foot per minute to about eight feet per minute.

The base 40 can optionally serve as a mechanism for adjusting the height of the table top 20 in addition to being a support for the table top 20. A lift mechanism enables the table top to be raised at least to the height of the conveyer belt for receiving an object to be turned, and then lowered to height where installation of components can be performed more safely, i.e., without the need for use of a stepladder, and in either a sitting or standing position. Accordingly, a mechanism for adjusting the height of the table top is preferably a feature of the heavy-object rotating apparatus, regardless of whether this mechanism is integral with or in addition to the base. In the illustrated embodiment, the lift mechanism is a scissors lift rated at 2000 lbs capacity. Again, the choice of components and specifications are based on the object to be turned, economics and availability. In the case of a 350 pound oven, a 2000 pound capacity scissors lift was chosen because it cost the same as the smaller available lift, a 500 pound capacity lift.

Figure 2:
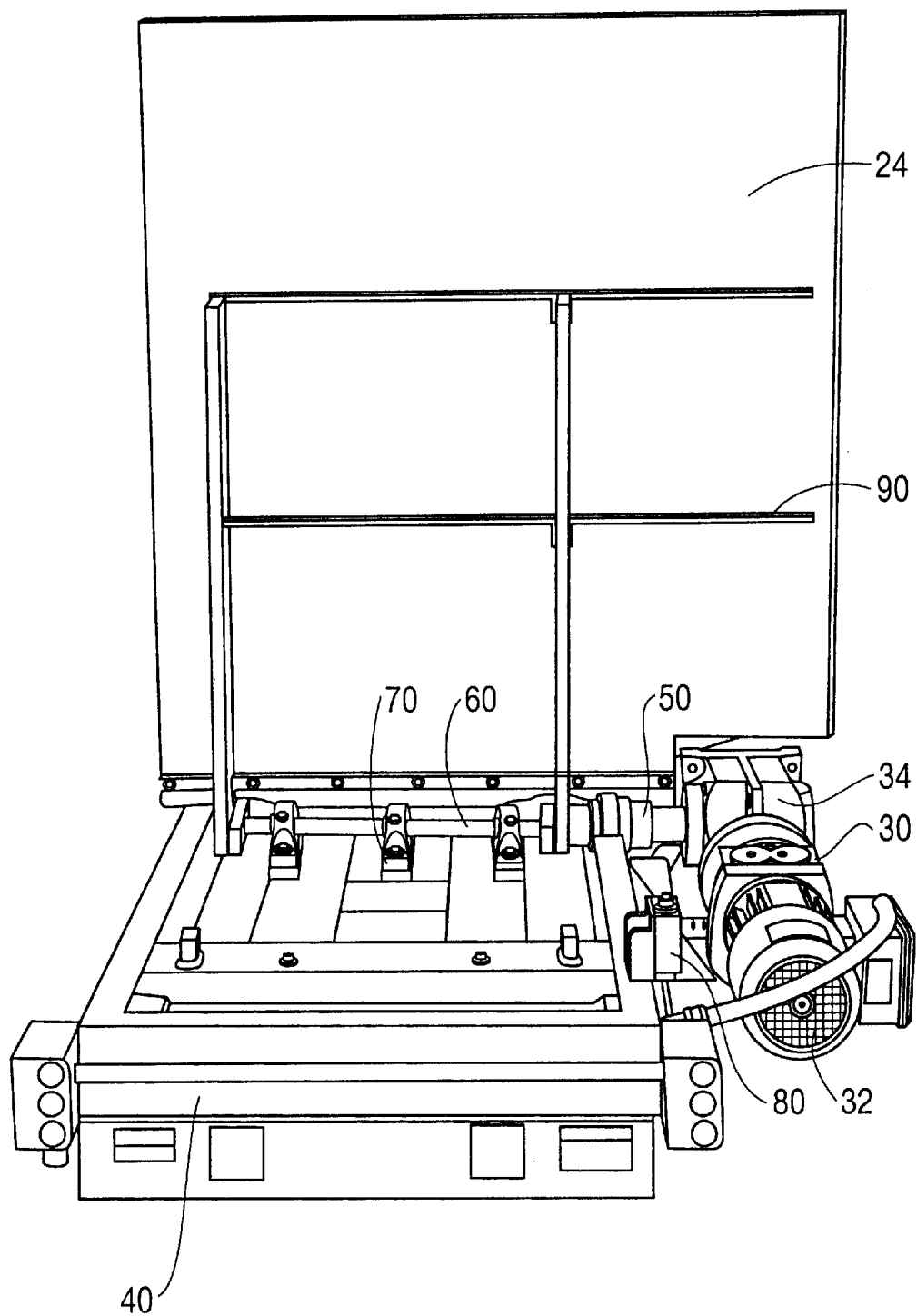
FIG. 2 is a front view of the apparatus of FIG. 1 with the first table portion in the second raised position.

As shown in FIG. 2 the heavy object rotation apparatus also includes a coupler 50, a shaft 60, a plurality of bearings 70, a first up limit switch 80, and a first bracket 90. As can be seen, the first portion 22 is disposed on the base 40 via the first bracket 90, the shaft 60, and the bearings 70. Specifically, the first portion 22 is mounted on the first bracket 90, which in turn is mounted on the shaft 60, which in turn is supported by the bearings 70, which in turn are mounted on the base. The shaft 60 is connected to the gear box 34 via the coupler 50 such that operation of the motor causes the shaft to rotate. The first portion 22 is rigidly mounted to the shaft 60 such that rotation of the shaft causes rotation of the first portion 22.

Figure 3:
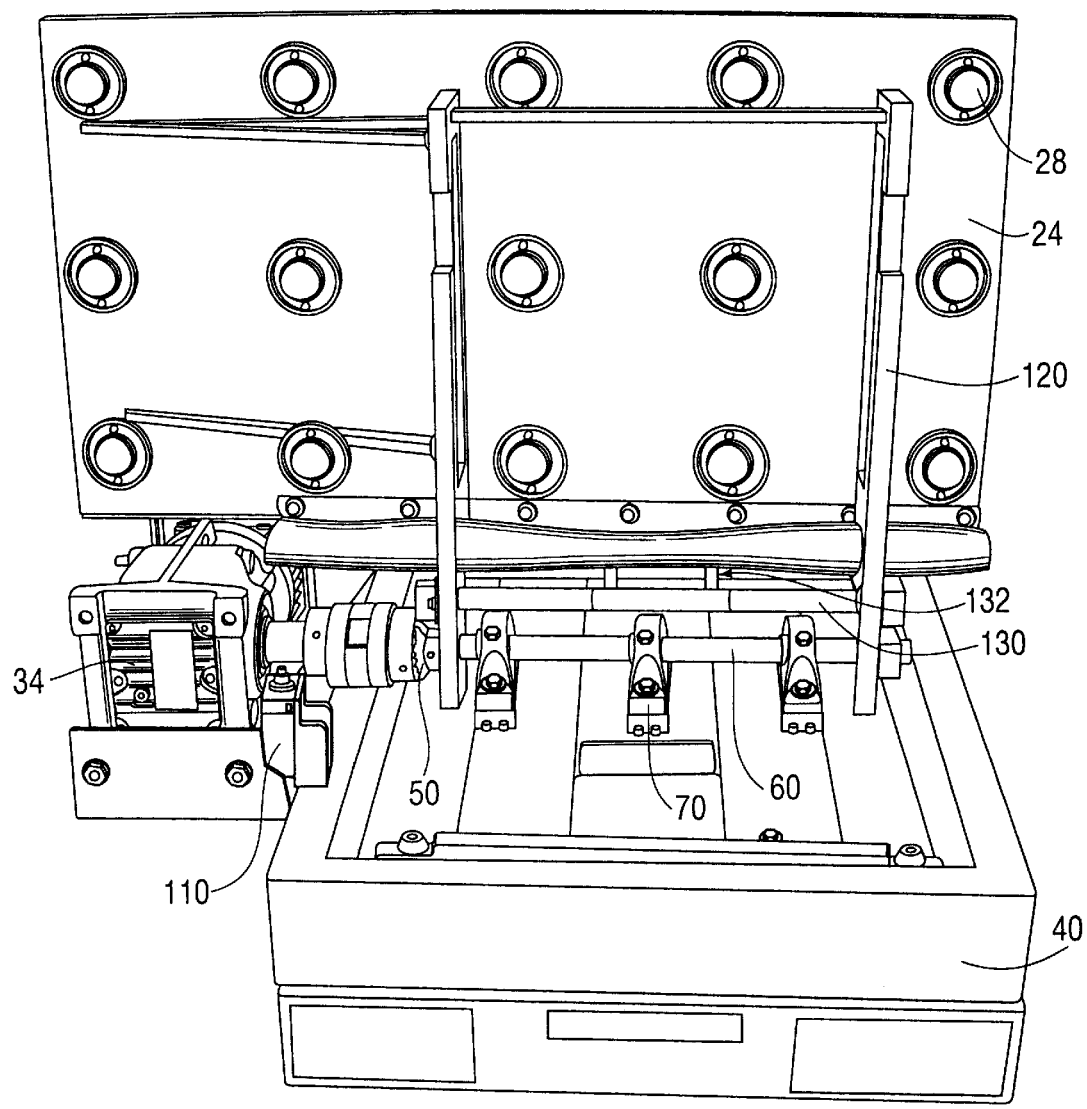
FIG. 3 is a rear view of the apparatus of FIG. 1 with the second table portion in the second raised position.

As shown in FIG. 3, the heavy object rotation apparatus includes a second up limit switch 110, and the second portion 24 is also disposed on the base 40 via a bracket, the second bracket 120, the shaft 60, and the bearings 70. However, unlike the first portion 22, the second portion 24 is not fixedly mounted on the shaft 24 and consequently rotation of the shaft 60 does not cause rotation of the second portion 24. Instead, an engagement mechanism 130, which in the case of the illustrated embodiment is a member having release pins 132, is attached to the second bracket 120. When the engagement mechanism 130 is engaged, the first portion 22 and the second portion are locked together and rotation of the shaft 60 results in rotation of both the first and second portion. When the engagement mechanism 130 is disengaged, rotation of the shaft 60 only results in rotation of the first portion 22. Further, when the engagement mechanism 130 is disengaged, the second portion 24 can freely rotate about the shaft 60 and thus can be manually moved back and forth between a raised and lowered position.

Figure 4:
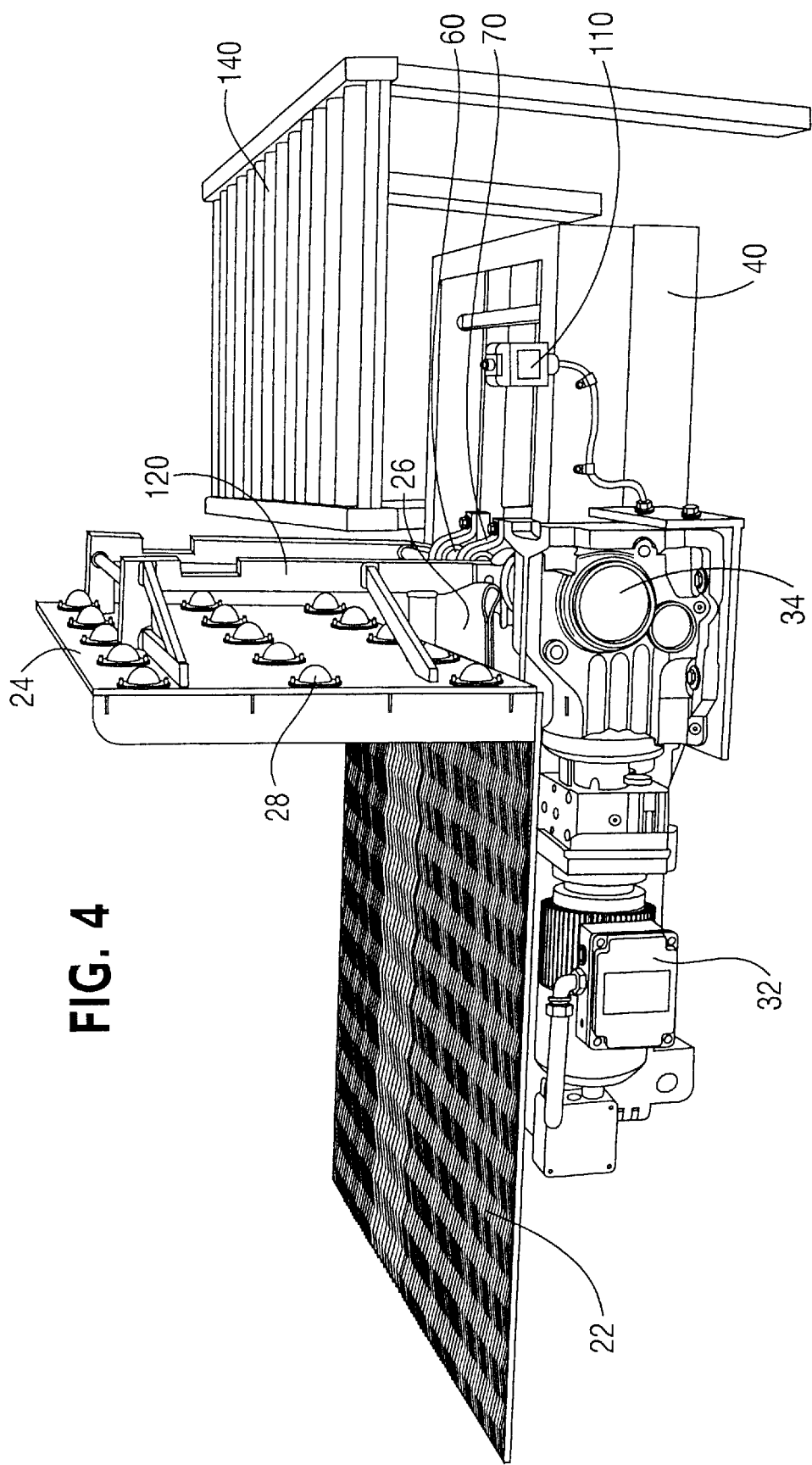
FIG. 4 is a perspective view of the apparatus of FIG. 1 with the second table portion in the second raised position.
Figure 5:
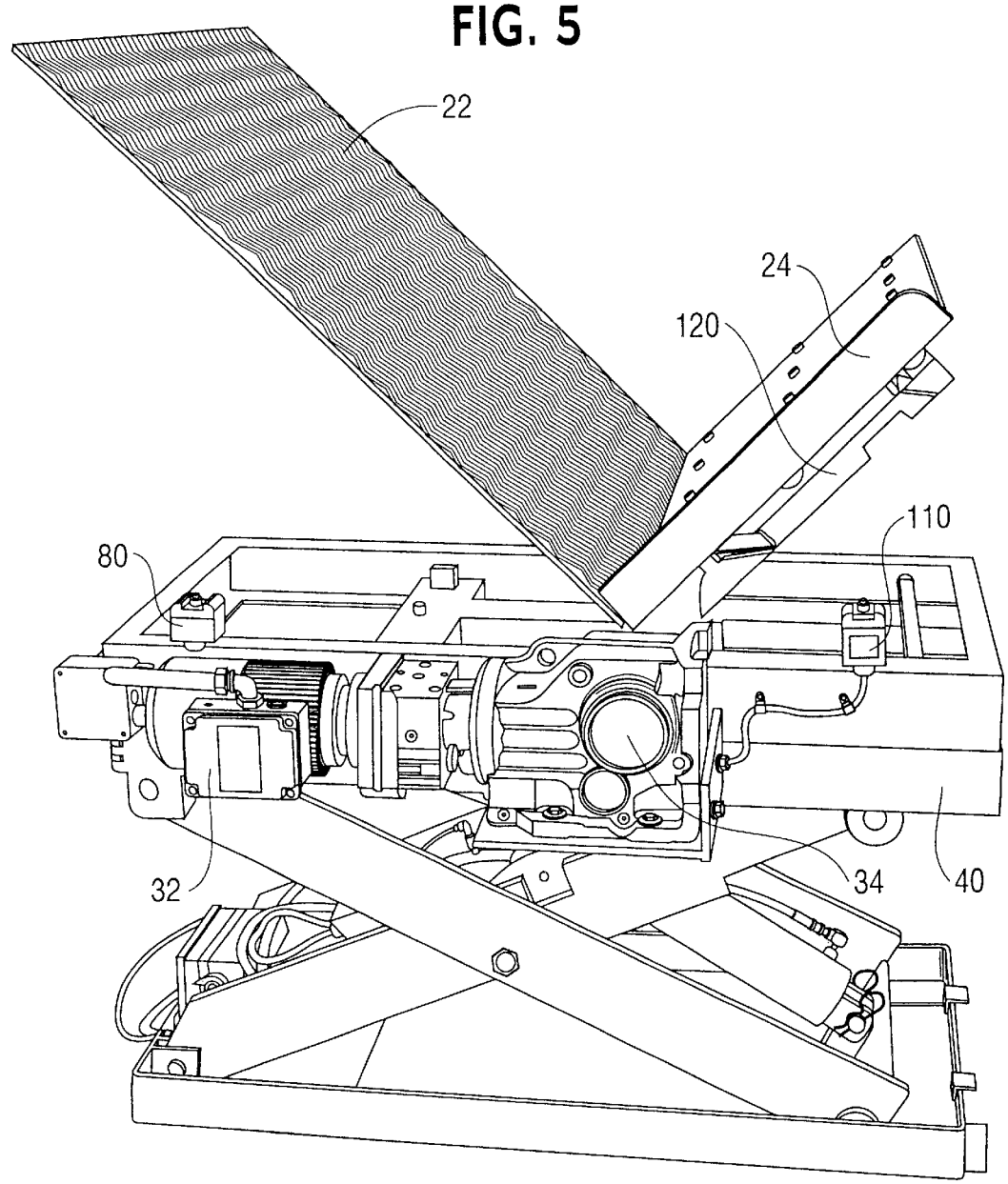
FIG. 5 is a perspective view of the apparatus of FIG. 1 with the first and second table portions in a raised position.
Figure 6:
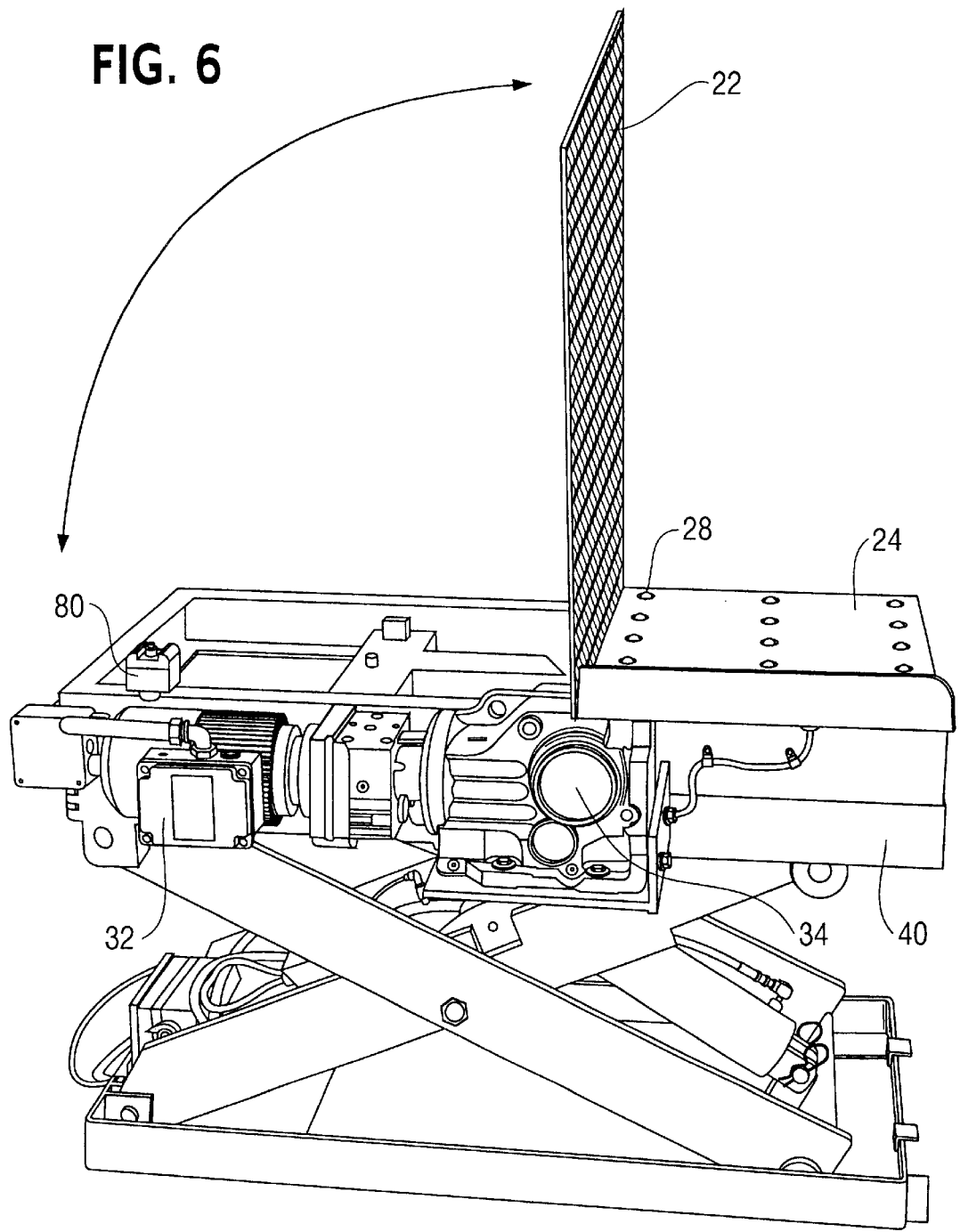
FIG. 6 is a perspective view of the apparatus of FIG. 1 with the first table portion in the first, raised position.

FIGS. 4–6 illustrate operation of the heavy-object rotating apparatus shown in FIGS. 1–3. As shown in FIG. 4, in preparation for receiving an object from, for example, a conveyer belt 140, the second portion 24 is manually rotated from a first, lowered position to a second, raised position. Where the apparatus is used as a work bench in addition to turning objects, the first, lowered position is typically approximately parallel with the floor. The second, raised position depends on the shape of the object to be turned. In a typical case, in which the object is rectangular, the second, raised position is approximately perpendicular to the floor, and therefore approximately ninety degrees from the first, lowered position.

Next, engagement mechanism 130 is engaged, locking together the first portion 22 and the second portion 24. As shown in FIG. 5, when the first portion 22 and the second portion 24 are locked together and the drive system 30 is turned on, rotation of the shaft 50 results in the first portion 22 and second portion 24 pivoting together in a clockwise direction in this exemplary embodiment. As shown in FIG. 6, movement of the first portion 22 and second portion 24 ceases when the second portion 24 engages the second up limit switch 110, preventing further rotation. Typically, rotation ceases when the second portion 24 is approximately parallel to the floor and thus also the conveyer belt 140.

The base 40 then lifts the table top 20 to the level of the conveyer belt 140, which belt 140 delivers a heavy object to the table top 20. Once adjusted to the appropriate height, the second portion 24 receives the heavy object. Ball transfers 28 mounted on the second portion 24 ease the movement of the heavy object. It should be noted that the table top 20 may also be raised prior to or during rotation of the table top 20. In fact, FIG. 5 illustrates an embodiment wherein the table top 20 has been raised prior to rotation.

The drive system 30 is again engaged, causing the first portion 22 and second portion 24 to once again pivot together, but this time in the opposite direction, i.e. counterclockwise in this exemplary embodiment, and until the first portion 22 engages first up limit switch 80, preventing further rotation. Typically, rotation ceases when the first portion 22 is approximately parallel to the floor.

The engagement mechanism 130 is then disengaged and the second portion 24 is manually rotated so that first 22 and second portions 24 form a level work bench. When the second portion 24 is manually rotated to its lowered position, it contacts second up limit switch 110. When both the first up limit switch 80 and the second up limit switch 110 are engaged, as when both the first portion 22 and the second portion 24 are in their lowered positions, the table top 20 is prevented from rotating, even if the motor is accidentally switched on. The table top 20 can now be lowered using the scissors lift 40 to a comfortable working height.

After installation of components, the second portion 24 is manually rotated to the second, raised position, and the engagement mechanism 130 is once again engaged, locking together the first portion 22 and the second portion 24. The drive system 30 is turned on, once again causing the first portion 22 to rotate from the first, lowered to the second, raised position, and consequently the second portion 24 to rotate between its second, raised and first, lowered position. When the second portion 24 reaches its lowered position, it contacts the second up limit switch 110, preventing further rotation. The scissors lift 40 can then be used to raise the table top 20 to the height of the conveyer belt, and the heavy object can then be rolled off.

The many features and advantages of the invention are apparent from the detailed specification, and thus, it is intended by the appended claims to cover some or all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. Thus, for example, although the above-illustrated embodiment exemplifies a heavy-object rotating apparatus having only a first table top portion operatively connected to a drive system, a person of ordinary skill should readily recognize that the apparatus could be configured such that both the first table-top portion and the second table-top portion are operatively connected to a drive system. Such an alternative embodiment would therefore be considered within the scope of the invention.

What is claimed is:

1. An apparatus for rotating heavy objects, comprising: a table top comprising a first portion and a second portion; a base; a drive system; and an engagement mechanism for reversibly locking the first portion and the second portion together; wherein, the first portion and second portion are independently, pivotally disposed on the base such that each can move between a first, lowered position and a second, raised position; and wherein the first portion is further operatively connected to the drive system, further comprising a first and a second up limit switch; wherein, the first up limit switch prevents the drive system from further rotating the first portion, alone or when locked together with the second portion, when tripped by rotation of the first portion, and the second up limit switch prevents the drive system from further rotation of the second portion when locked together with the first portion, when tripped by rotation of the second portion.

2. An apparatus according to claim 1, wherein the base comprises a height adjustment mechanism.

3. An apparatus according to claim 2, wherein the height adjustment mechanism is a scissors lift.

4. An apparatus according to claim 1, wherein the drive system is a motorized drive system.

5. An apparatus according to claim 4, wherein the drive system comprises a motor and at least one gear box, the first portion is operatively connected to the drive system via a shaft and a coupler such that engagement of the motor causes the shaft to rotate and first portion to pivot.

6. An apparatus according to claim 5, wherein engagement of the motor causes the first and second portions to pivot together when the engagement mechanism is engaged.

7. An apparatus for rotating heavy objects, comprising: a table top disposed on a base, the table top comprises independently pivotable first and second portions; a drive system means for pivoting the table top operatively connected to at least the first portion; and an engagement means for reversibly locking together the first portion and second portion, wherein engagement of the drive system means causes only the first portion to pivot unless the first portion and second portion are locked together.

8. An apparatus according to claim 7, further comprising a lift means for raising and lowering a table top.

9. An apparatus according to claim 8, wherein the lift means is integral with the base.

10. An apparatus according to claim 9, wherein the base, and therefore the lift means, is a scissors lift.

11. An apparatus according to claim 7, wherein the drive system means comprises a motor and at least one variable speed gear box.

12. An apparatus according to claim 11, wherein the drive system means further comprises a frequency inverter.

13. An apparatus according to claim 7, wherein the apparatus further comprises a safety means for stopping table rotation.

14. An apparatus according to claim 13, wherein the safety means comprises a first up limit switch and a second up limit switch; wherein, the first up limit switch prevents the drive system from further rotating the first portion, alone or when locked together with the second portion, when tripped by rotation of the first portion, and the second up limit switch prevents the drive system from further rotation of the second portion when locked together with the first portion, when tripped by rotation of the second portion.

15. An apparatus according to claim 7, wherein the first portion is operatively connected to the drive system means via a shaft.

16. A method for rotating heavy objects, comprising: providing a table top comprising a first portion and a second portion; a base; a drive system; and an engagement mechanism for reversibly locking the first portion and the second portion together; wherein, the first portion and the second portion are independently, pivotally disposed on the base such that each can move between a first, lowered position and a second, raised position; and wherein the first portion is further operatively connected to the drive system;

engaging the drive system unit the first portion reaches the second raised position;

engaging the engagement mechanism thereby locking together the first portion and the second portion;

placing an object to be turned on the second portion; and engaging the drive system until the first portion moves back to the first lowered position, wherein the base is a scissors lift.

17. A method according to claim 16, further comprising: disengaging the engagement mechanism; and manually rotating the second portion from the second, raised position to the first, lowered position.

* * * * *